UNITED STATES PATENT OFFICE.

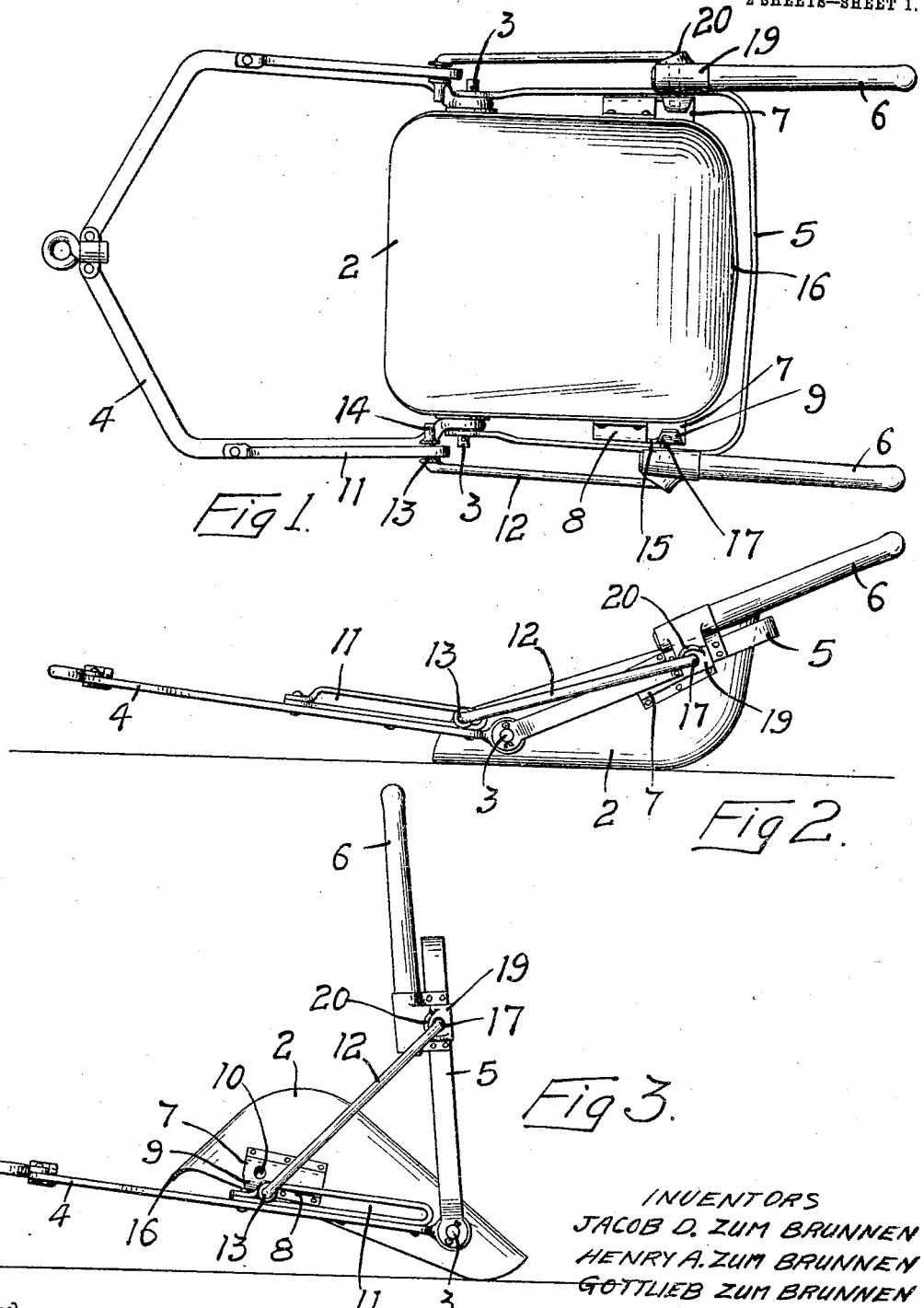

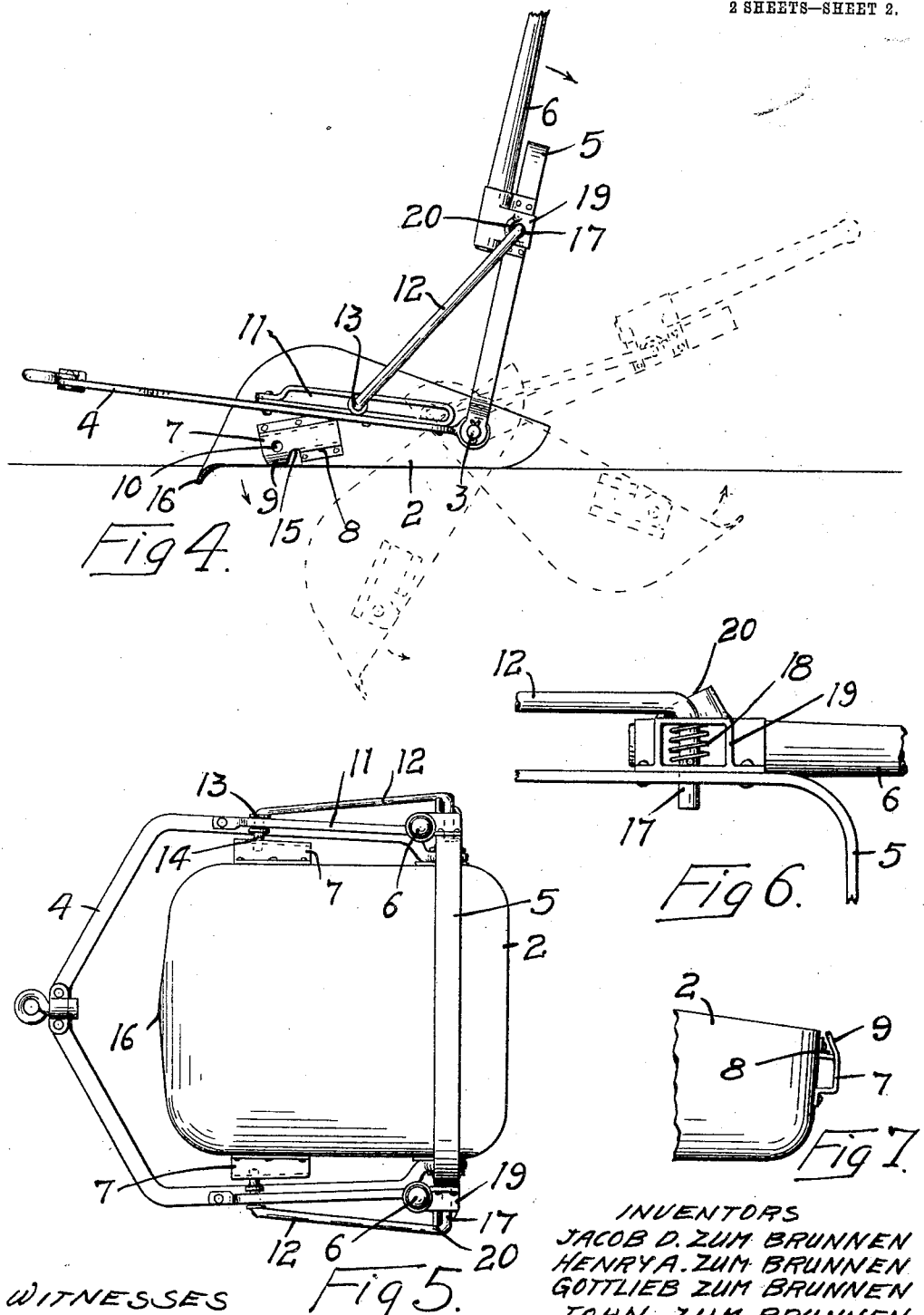

JACOB D. ZUM BRUNNEN, HENRY A. ZUM BRUNNEN, GOTTLIEB ZUM BRUNNEN, JOHN ZUM BRUNNEN, AND LOUIS ZUM BRUNNEN, OF MONTICELLO, MINNESOTA.

SCRAPER.

932,954.      Specification of Letters Patent.     Patented Aug. 31, 1909.

Application filed September 3, 1908. Serial No. 451,613.

*To all whom it may concern:*

Be it known that we, JACOB D. ZUM BRUNNEN, HENRY A. ZUM BRUNNEN, GOTTLIEB ZUM BRUNNEN, JOHN ZUM BRUNNEN, and LOUIS ZUM BRUNNEN, all of Monticello, Wright county, Minnesota, have invented certain new and useful Improvements in Scrapers, of which the following is the specification.

Our invention relates to road scrapers and the object of the invention is to provide means whereby when the scoop of the scraper is inverted to dump its load, and the scraper is ready for return to the work, it will not be necessary for the operator to stoop and pick up the handles of the scraper which ordinarily has to be done in scrapers as usually made.

A further object, is to reduce the labor of operating a scraper and facilitate the work of grading.

Other objects of the invention will appear from the following detailed description.

The invention consists generally in various constructions and combinations, all as hereinafter described, and particularly pointed out in the claims.

In the accompanying drawings forming part of this specification, Figure 1 is a top view of a scraper embodying our invention, Fig. 2, is a side view of the same, Fig. 3, is a similar view illustrating the scoop in an inverted position, Fig. 4, is a side view of the scraper showing in dotted lines, the different positions assumed by the scoop in returning from an inverted to an operative position. Fig. 5, is a top view showing the scoop inverted. Figs. 6 and 7, are detailed views showing the latch mechanism for locking the scoop in position to receive its load.

In the drawing, 2 represents the scoop having laterally projecting studs 3 thereon near its forward end. A draft bail 4 has its ends mounted on said studs and a handle bail 5 is also mounted on said studs and provided with suitable operating handles 6. Boxes 7 are secured to the sides of the scoop near its rear end and have flat bearing surfaces 8 thereon and cam lips 9 and holes 10 beneath said lips. The draft bail is provided with guide-ways 11 and rods 12 have inwardly turned ends 13 which slide in said guide-ways, said ends terminating in studs 14 which are adapted to engage the flat surfaces 8 and temporarily limit the tilting of the scoop. If desired, the stops 14 may be allowed to enter notches 15 provided in the boxes 7 when the scoop will be held in the position indicated in Fig. 3, and may be conveniently dragged from place to place. If the stops are prevented from entering the notches 15 and slide back over the flat surfaces of 8, the scoop will drop down upon the ground as soon as the stops pass out of engagement with said surfaces, and a projecting heel portion 16 will dig into the soil and cause the scoop to assume the positions indicated by dotted lines, in Fig. 4. As the scoop swings to an upright position, the handle bail is swung down to meet it, and the inwardly turned ends 17 on the rods 12, will engage the cam lips 9 and be guided thereby into the holes 10. Springs 18 are provided on the ends 17 of the rods 12, and normally tend to hold the said ends in the holes 10 and lock the scoop against premature tilting. The ends 17 of the rods 12 have bearings in brackets 19 on the handle bail and cam surfaces 20 are mounted on said brackets and adapted to engage the rods 12 when the bail is swung on its pivot for the purpose of moving said rods laterally and withdrawing the ends 17 from engagement with the holes in the boxes 7. The rods will be moved slowly through the engagement of the cam surfaces therewith, and will release the scoop when it has been tilted sufficiently to discharge its load. The scoop will then tip forward by gravity to an inverted position, while the handle bail will remain in an upright position in the grasp of the operator of the scraper. If for any reason, the scoop should stick and fail to tip forward when released, the engagement of its nose with the ground and the forward movement of the team will insure the swinging of the scoop to an inverted position. The heel portion 16 will dig into the soil when the scoop is inverted, and the travel of the team will cause the scoop to swing under the bail and return to its normal upright position as indicated by dotted lines in Fig. 4. The handle bail will then be depressed to meet the scoop and the bail and the scoop will interlock automatically and be held against premature separation, and the scraper will then be ready for another load.

It will be noted, that only a few parts are added to the scoop of ordinary construction to render it self-righting and capable of dumping without throwing the handles forward to the ground or necessitating the stooping of the operator to pick up the handles and reverse the scoop.

We claim as our invention:—

1. A road scraper, comprising a scoop, a draft bail pivoted thereon, a handle bail also pivoted on said scoop, the pivots of said bails being located near the nose of said scoop, handles mounted on said handle bail, means carried by said handle bail for locking said scoop against premature movement, and means made operative by the forward movement of said handles for tripping said locking means and releasing said scoop, substantially as described.

2. A scraper comprising a scoop and bails pivoted thereon near the nose of said scoop, one of said bails having a draft connection and the other bail having suitable handles, means pivotally connected with said handle bail and having a sliding connection with said draft bail, said means having a locking device to prevent premature movement of said scoop, and means rendered operative by the forward movement of said handles for actuating said connecting means and disengaging said locking device, substantially as described.

3. A scraper comprising a scoop having boxes secured on each side thereof, and provided with cam tongues and holes below said tongues and flat bearing surfaces, bails pivoted on said scoop near its forward end, one of said bails having a draft connection and handles mounted on said other bail, rods carried by said bails and having inwardly turned ends forming locks for said scoop and stops to engage the flat surfaces of said boxes, said stops being moved into the path of said boxes by the forward movement of said handles and handle bail, substantially as described.

4. A scraper comprising a scoop having boxes mounted thereon and notches provided in said boxes, a draft bail and a handle bail provided on the nose of said scoop, said handle bail having handles mounted thereon, rods pivoted at one end on said handle bail and having inwardly turned opposite ends arranged to slide in guide-ways on said draft bail and said inwardly turned ends having stops formed thereon which are adapted to enter the notches in said boxes, and limit the forward tilting movement of said scoop for the purpose specified.

5. A road scraper comprising a scoop, a draft bail and a handle bail having common pivots on the forward portion of said scoop, handles mounted on said handle bail, means for locking said scoop against premature movement and means rendered operative by the forward movement of said handles for tripping said locking means and releasing said scoop.

6. A scraper comprising a scoop having a heel formed thereon, a draft bail and a handle bail pivoted on said scoop, handles mounted on said handle bail, means for locking said scoop against premature movement, means rendered operative by the forward movement of said handles for tripping said locking means and releasing said scoop and said heel being adapted to engage the soil when said scoop is inverted and insure the return of said scoop to its normal operative position, substantially as described.

7. A scraper comprising a scoop having boxes secured on each side thereof, and provided with flat bearing surfaces, a draft bail and a handle bail pivoted on said scoop near its forward ends, handles mounted on said draft bail, rods carried by said bails and having inwardly turned ends forming locks for said scoop and stops to engage said flat surfaces, said rods having a sliding connection with said draft bail and said stops being moved into the path of said flat surfaces by the forward movement of said handle bail, substantially as described.

8. A scraper, comprising a scoop, draft and handle bails therefor, means for locking said scoop against premature movement and means rendered operative by the movement of said handle bail for tripping said locking means.

9. A scraper, comprising a scoop, and draft and handle bails therefor, means pivotally connected with said handle bail and having a sliding connection with said draft bail, means preventing premature movement of said scoop, and means rendered operative by the forward movement of said handle bail for tripping said locking means.

10. A road scraper, comprising a scoop, a draft bail and a handle bail thereon, means for locking said scoop against premature tilting to dump its contents, and means rendered operative by the forward movement of said handle bail for tripping said locking means, said scoop describing a revolution within said bails while tilting to discharge its contents and returning to its normal, upright, receiving position.

In witness whereof, we have hereunto set our hands this 29 day of August 1908.

JACOB D. ZUM BRUNNEN.
HENRY A. ZUM BRUNNEN.
GOTTLIEB ZUM BRUNNEN.
JOHN ZUM BRUNNEN.
LOUIS ZUM BRUNNEN.

Witnesses:
B. A. FINCH,
J. H. WHITNEY.